Figure 1:
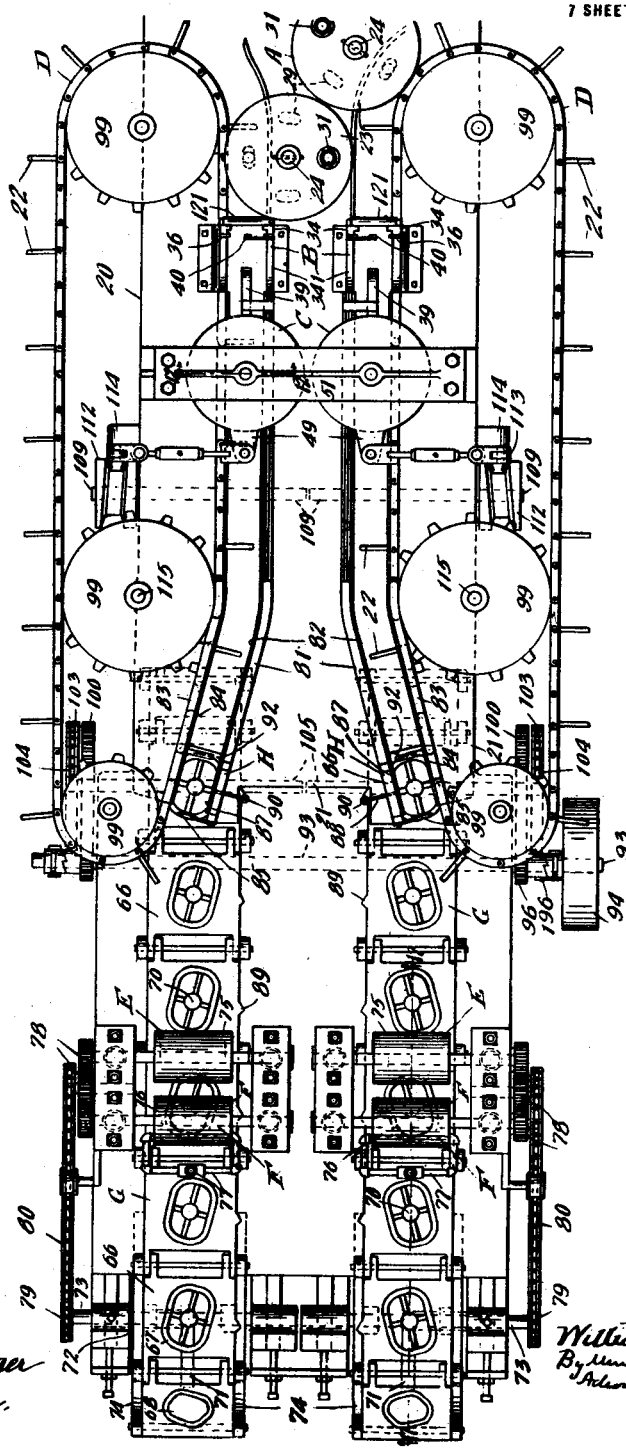

W. E. TAYLOR.
MACHINE FOR APPLYING HEADS TO CAN BODIES.
APPLICATION FILED NOV. 17, 1911.

1,200,273.

Patented Oct. 3, 1916.
7 SHEETS—SHEET 2.

Witnesses:
Wm Geiger
N. W. Munday

Inventor:
William E. Taylor
By Munday, Evarts, Adcock & Clarke,
Attys.

W. E. TAYLOR.
MACHINE FOR APPLYING HEADS TO CAN BODIES.
APPLICATION FILED NOV. 17, 1911.
1,200,273.
Patented Oct. 3, 1916.
7 SHEETS—SHEET 4.
Fig. 4
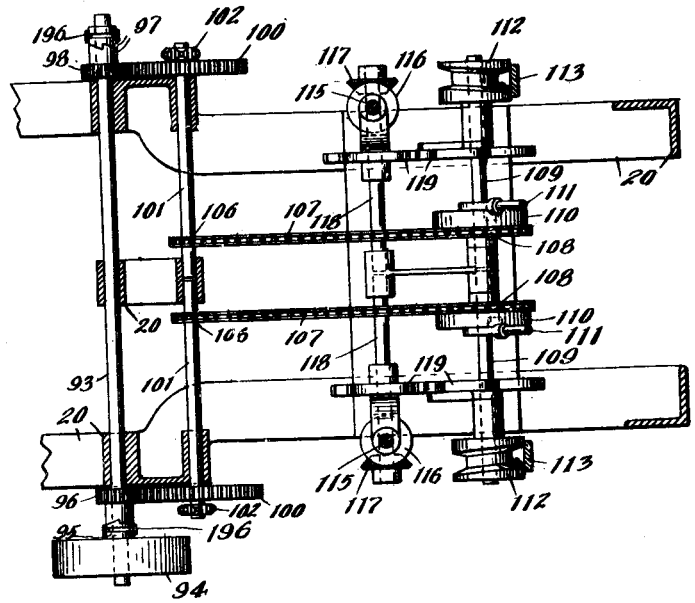
Fig. 5
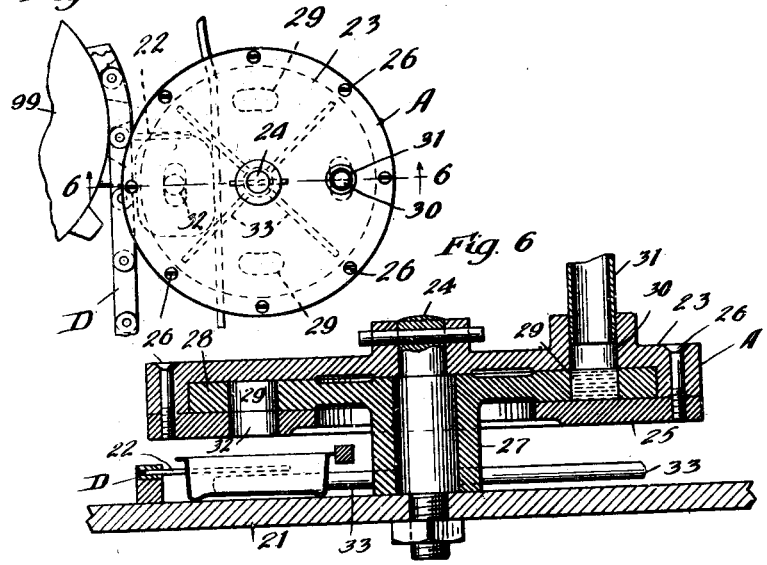
Fig. 6
Witnesses:
Inventor:
William E. Taylor
By Munday, Evarts, Adcock & Clarke.
Attys.

W. E. TAYLOR.
MACHINE FOR APPLYING HEADS TO CAN BODIES.
APPLICATION FILED NOV. 17, 1911.
1,200,273.
Patented Oct. 3, 1916.
7 SHEETS—SHEET 5.
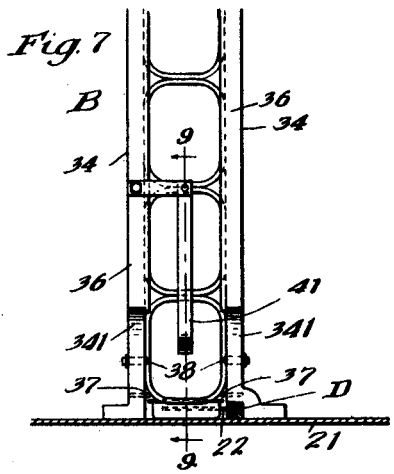
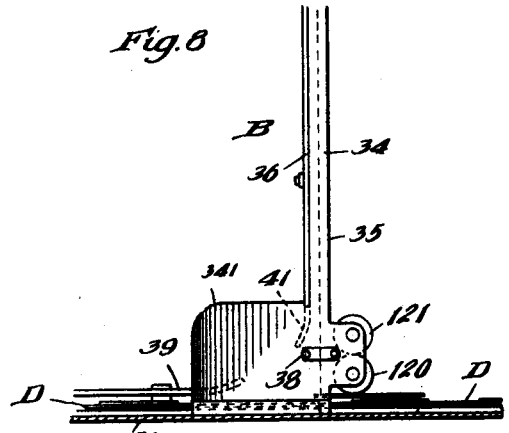
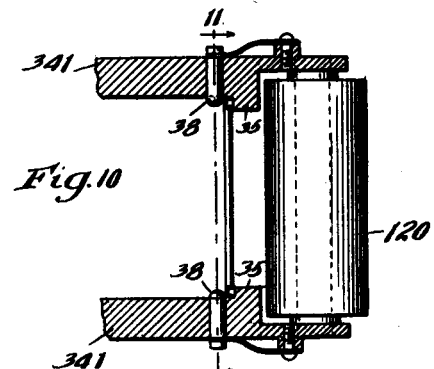
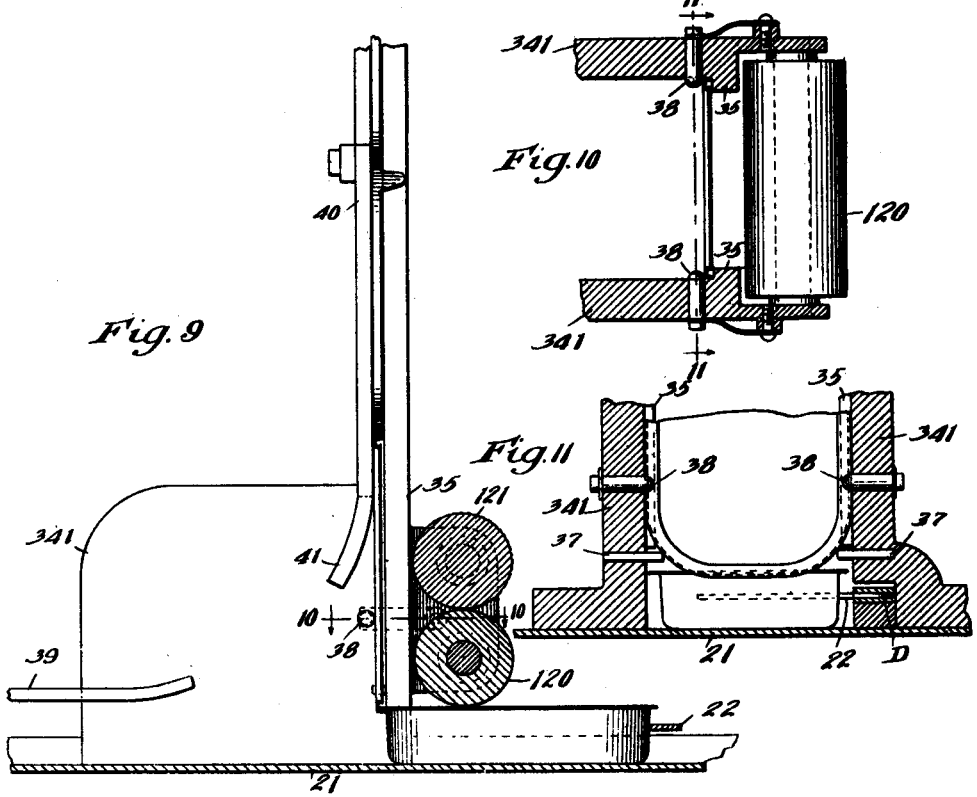
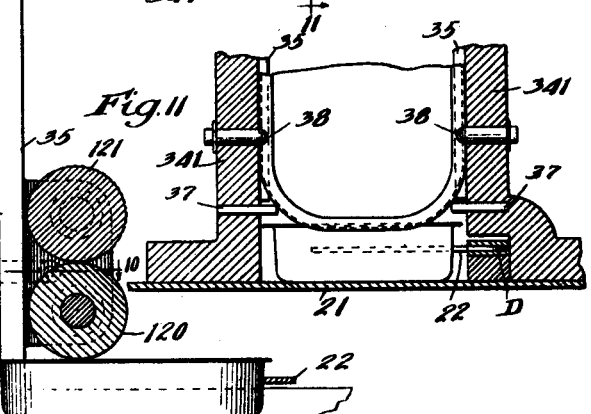
Witnesses:
Inventor:
William E. Taylor
By Munday, Evarts, Adcock & Clarke,
Attys

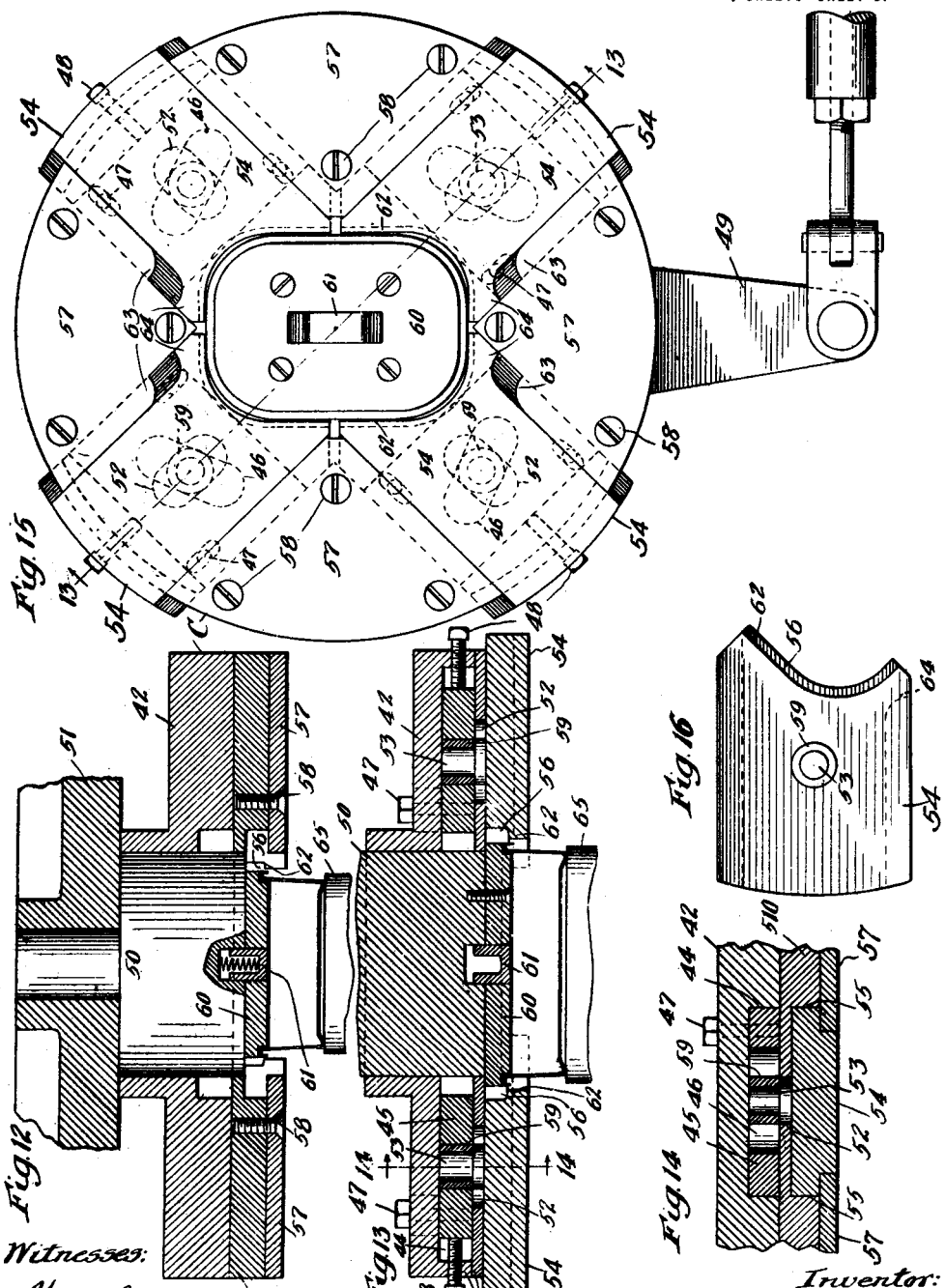

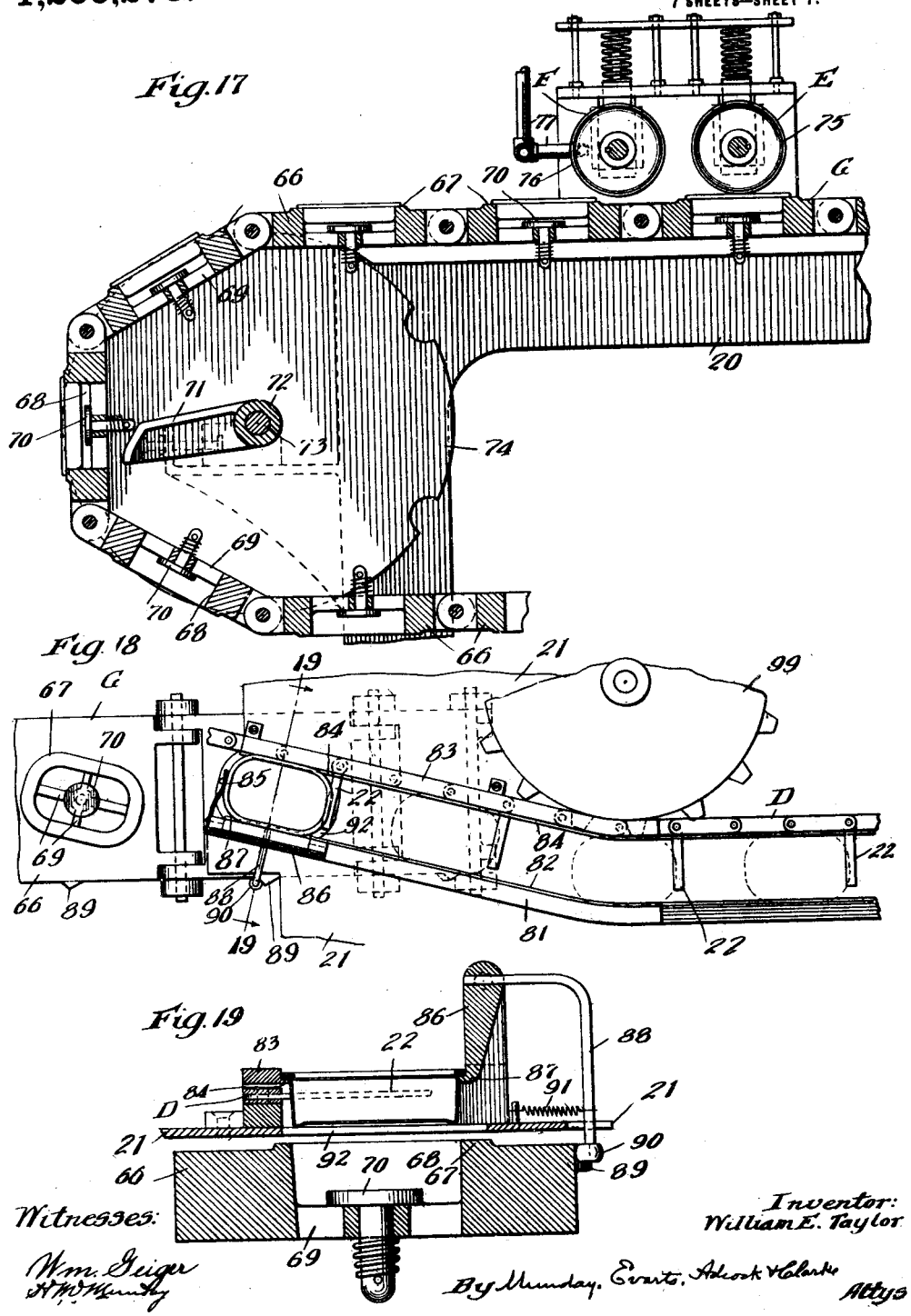

UNITED STATES PATENT OFFICE.

WILLIAM E. TAYLOR, OF EASTPORT, MAINE, ASSIGNOR TO AMERICAN CAN COMPANY, OF NEW YORK, N. Y., A CORPORATION OF NEW JERSEY.

MACHINE FOR APPLYING HEADS TO CAN-BODIES.

1,200,273.   Specification of Letters Patent.   Patented Oct. 3, 1916.

Application filed November 17, 1911. Serial No. 660,814.

*To all whom it may concern:*

Be it known that I, WILLIAM E. TAYLOR, a citizen of the United States, residing in Eastport, in the county of Washington and State of Maine, have invented a new and useful Improvement in Machines for Applying Heads to Can-Bodies, of which the following is a specification.

This invention relates to improvements in a machine for applying heads to can bodies.

Heretofore in machines adapted to solder covers to filled cans, as distinguished from machines for "tipping" the vent hole or applying "cap" pieces, it has been customary to use a strip of solder between the cover and the body flanges and then to fuse it. This method, however, is comparatively expensive and results in the loss of many cans due to leaks and pin holes resulting from the difficulty of forming a perfect joint entirely around the seam.

One method of overcoming the difficulties mentioned above has been devised, in which the solder is first fused to the flange of either the cover or the body before the cover is placed on the body, and then by applying heat, subsequently fusing the two flanges together. And in this process it has been found desirable to fuse the two flanges together progressively point by point in order to allow for the escape of gases produced or the expansion of the air within the can body incident to the heat from the heating or fusing device. This latter process has not proven entirely successful, and many cans are produced that develop pin holes and leaks, which are due, as I have demonstrated by experiment, to the fact that after the cover and body flanges have been fused together, and while the solder is setting or cooling, the flanges tend to separate, which separation is caused partly by the contraction of the metal and partly by the inherent springiness of the metal which is not entirely eliminated by the fusing or sweating operation. To prevent this springing or spreading apart of the flanges, the covers and bodies have been made with one of the flanges wider than that of the other, and the wider flange has been tucked or folded or bent around the narrower one, the seam thus formed being then tightly compressed in order to remove all puckers, irregularities and springiness from the metal, and to produce a close contact between each of the folds of the seam, and then the solder is subsequently fused. On account of the mechanical union of the flanges, due to the one being folded over or about the other and firmly compressed together, it becomes almost impossible for the flanges to warp or spring apart during the cooling of the solder, and in this way, a much better and more perfect can is produced.

The main object of my invention is to provide a machine which will successfully carry out the last process above outlined, and one wherein all the operations are performed automatically from the time the filled can body is presented to the machine until the can body with its cover applied, tucked and fused thereto, is ejected from the machine.

My invention relates more particularly to that class of cans used in packing sardines, wherein the can body is generally of rectangular shape, and wherein the body is filled with the sardines before the same is presented to the oiling and head applying machine.

Another object of my invention is to so construct the machine that I automatically supply a definite quantity of oil to each of the cans as they are successively fed along the bed of the machine, and wherein this oil measuring and feeding device is operated only when the can, filled with fish, is presented. By combining this oil measuring and feeding device with the head applying machine, I thereby greatly reduce the space which has hitherto been necessary in factories where the oil supplying device has been separated from the other mechanism, and also thereby eliminate one of the operators necessary to handle the cans in their travel through the factory. In feeding the cans to the tucking mechanism and during the tucking operation, it is preferable that the cans be fed intermittently, or that they have a period of rest while the tucking operation is being performed. During the fusing or sweating operation, it is preferred that the cans be continuously moved, and another object of my invention is to provide means of transferring the can with the tucked head or cover thereon from an intermittently operating conveyer to a continuously operating conveyer, and to so construct this transferring mechanism that the feed of the cans is determined by the presence of the pocket of the continuously operating conveyer underneath the transferring mechanism.

Still another object of my invention is to produce a machine of double capacity or in duplicate, whereby one half of the machine or one set of mechanism may be thrown out or rendered inoperative, while the other half of the machine or other set of operating mechanism is allowed to continue in operation.

My invention consists, therefore, in a machine comprising a suitable bed or frame adapted to support the various mechanisms, and an intermittently operating endless conveyer for feeding the cans to the oil measuring and feeding device, a head feeding device, a tucking mechanism, means for transferring the can body, with the head tucked thereon and filled with oil, to a continuously operating endless conveyer which feeds the can bodies and the heads thereto to a pressure device for squeezing the tucked seam, and subsequently to a fusing or heating device which fuses the solder between the flanges.

My invention consists in the improvements of various parts and devices and combinations of parts and devices herein shown, described and claimed.

Figure 2:
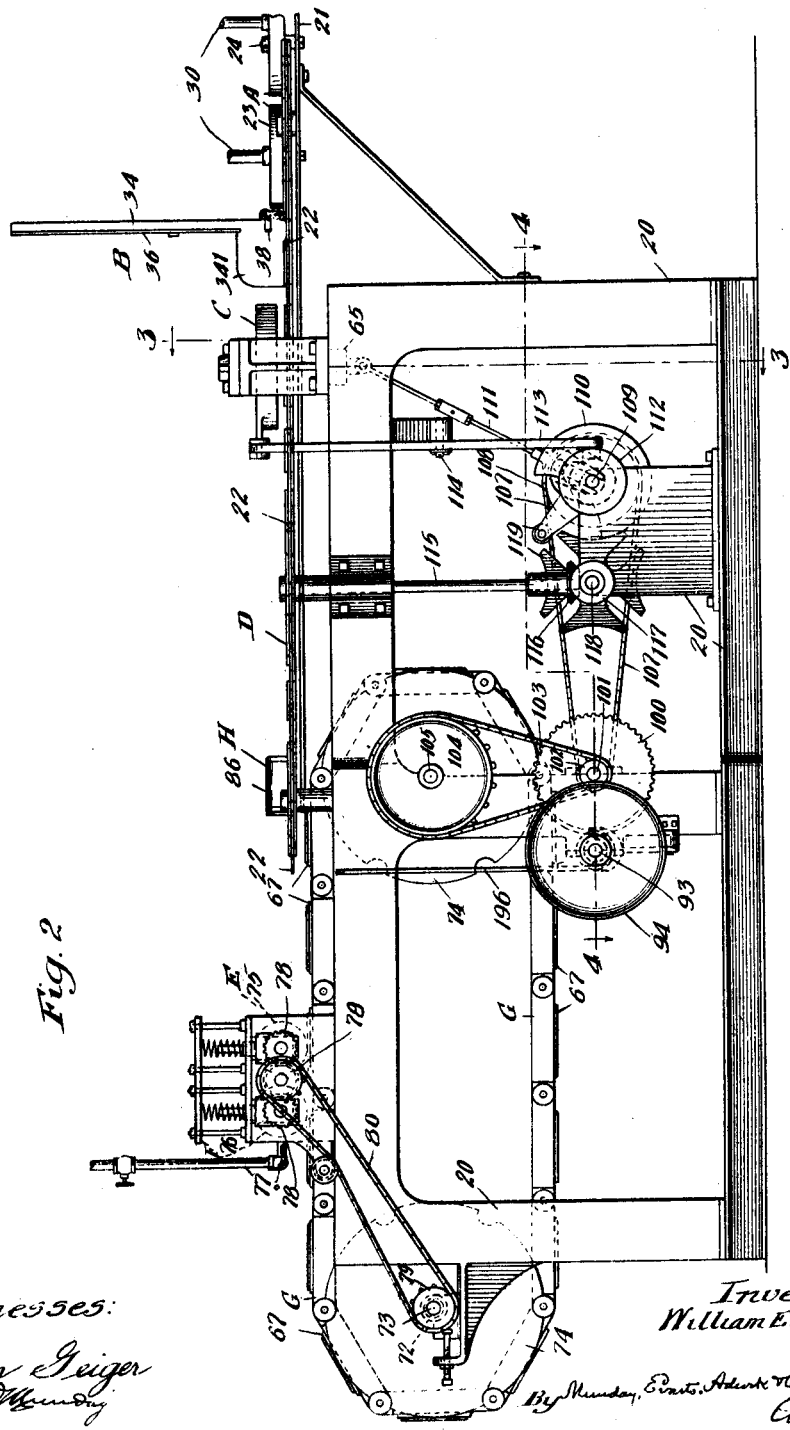
Figure 3:
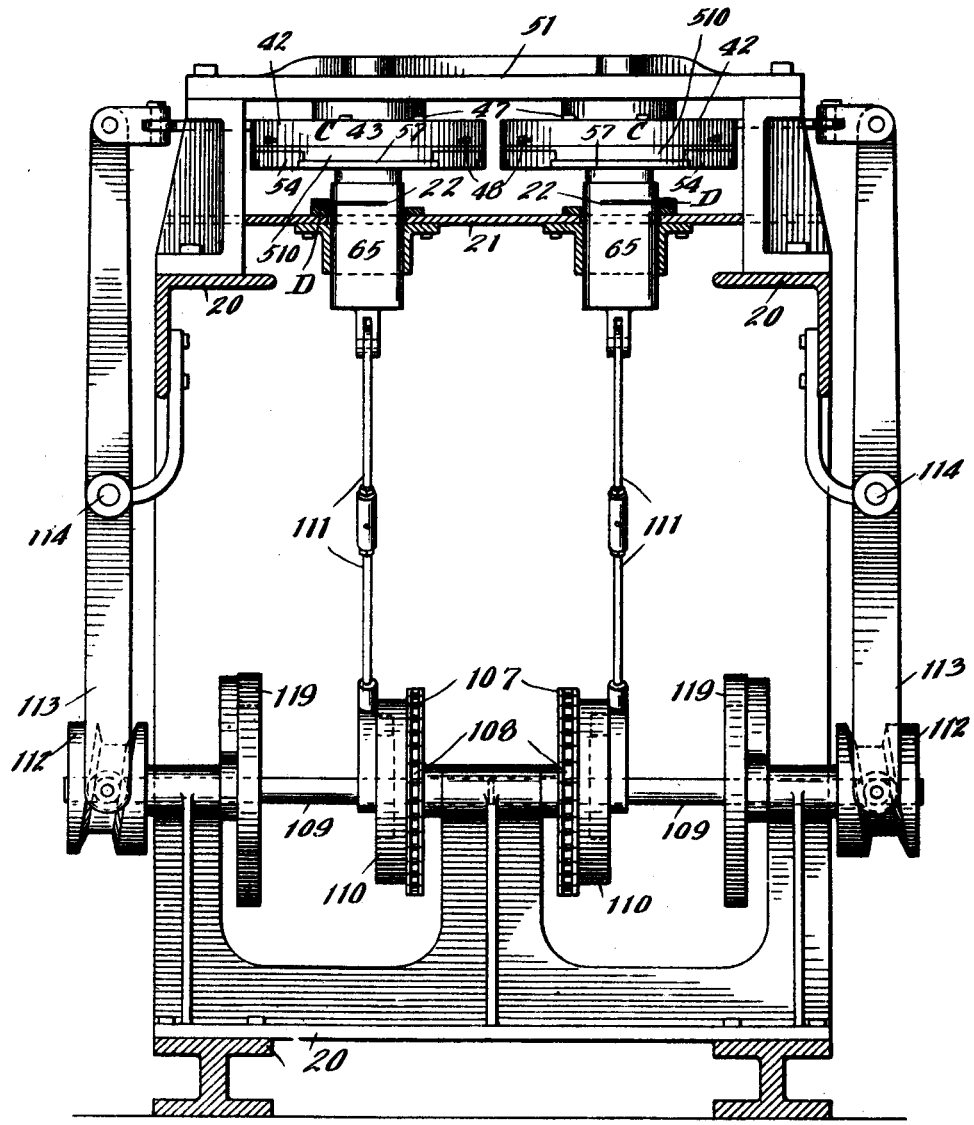

In the drawings forming a part of this specification, Figure 1 represents a plan view of the entire machine embodying my improvements. Fig. 2 is a side elevation of the same. Fig. 3 is a transverse, vertical section, taken substantially on the line 3—3 of Fig. 2. Fig. 4 is a horizontal section, taken on the line 4—4 of Fig. 2, showing more in particular the gearing for operating the various parts of the machine. Fig. 5 is a detail of the conveyer and the oil measuring and feeding device, upon an enlarged scale. Fig. 6 is a vertical section, upon an enlarged scale, taken on the line 6—6 of Fig. 5, showing in detail the oil feeding and measuring device. Fig. 7 is a detail of the head feeding device. Fig. 8 is a side elevation of the structure shown in Fig. 7. Fig. 9 is a detail view of the head feeding mechanism, taken on the line 9—9 of Fig. 7, showing the mechanism upon a larger scale than that shown in Figs. 7 and 8. Fig. 10 is a horizontal section upon an enlarged scale, taken on the line 10—10 of Fig. 9. Fig. 11 is a vertical section, upon an enlarged scale, of the structure shown in Figs. 7 to 10. Fig. 12 is a vertical section, taken on the line 12—12 of Fig. 1. Fig. 13 is a vertical section, taken on the line 13—13 of Fig. 15, the sections of Figs. 12 and 13 being taken substantially at forty-five degrees to each other. Fig. 14 is a detail, sectional view, taken on the line 14—14 of Fig. 13. Fig. 15 is a bottom plan view of one of the tucking mechanisms. Fig. 16 is a plan view of one of the folding or tucking members detached. Fig. 17 is an enlarged vertical section, taken on the line 17—17 of Fig. 1. Fig. 18 is an enlarged detail view of the transferring mechanism from the intermittently operating conveyer to the continuously operating conveyer. Fig. 19 is an enlarged, detail sectional view, taken substantially on the line 19—19 of Fig. 18.

My machine embodies two sets of operating devices which are arranged in duplicate and operate from the same power shaft, and inasmuch as the various mechanisms in each of the sets are substantially identical, I will only describe the mechanisms of one set or half of the machine.

In the drawings, the frame of the machine is represented by the reference 20; the oil mechanisms by A—A; the endless, intermittently operating conveyers by D—D; the head feeding devices by B—B; the head tucking mechanisms by C—C; the mechanisms for transferring the bodies from the intermittently operating conveyer to the continuously operating conveyer by H—H; the pressure rollers by E—E; the fusing or heating rollers by F—F; and the continuously operating die block, chains or conveyers by G—G.

The frame 20 is provided with a bed portion 21 at the front end thereof, upon which the can bodies, filled with sardines, are placed by the operator or are conveyed thereto by a belt from the packing tables. The can bodies are then engaged by the fingers or flights 22 on the endless conveyer, D, which travels around gears 99, and are pushed thereby to a position beneath the oil measuring and feeding device A. This conveyer D is so arranged that it comes to rest while the can body, engaged by one of the fingers 22, is under the oil measuring and feeding device A. This oil feeding mechanism comprises a casing 23, keyed or pinned to a stationary stud shaft 24 attached to the bed 21 by any suitable means, such as the bolt and nut structure shown. To the lower part of this casing 23 is attached an annular ring plate 25 by means of screws 26. Rotatably mounted on the shaft 24 is a hub 27, having formed integrally therewith a disk 28 adapted to have a sliding fit between the casing 23 and the annular plate 25. The disk 28 is provided with a plurality of recesses 29 equally spaced therearound and each adapted to in turn register beneath an inlet opening 30 in the casing 23, which opening 30 is in communication with a supply tank, not shown, by means of a pipe 31. The annular ring plate 25 is provided with an opening 32, preferably diametrically disposed to the inlet opening 30, which opening 32 is above the line of travel of the can bodies. Each of the openings 29 in the disk 28 is preferably somewhat elongated, in order that there may be plenty of time during the rotation of the disk, for the oil to flow therein from the inlet opening 30, and these openings 29 are made of the required size to hold the requisite amount of oil necessary to completely fill the can bodies as they are presented to the oil device.

In order to feed the oil to the cans at the proper time, and to insure that such feeding may take place only when a can body is under the outlet hole 32, I form rigidly with the hub 27 a star wheel construction, composed of radial arms 33, the number of said arms 33 corresponding to the number of measuring chambers or holes 29 in the disk 28. As the can body is fed along the table by the conveyer D, the body engages one of the arms 33, and thereby rotates the disk 28 until one of the holes 29 therein registers with the outlet hole 32, when it will be evident the oil drops down into the can body beneath. From the oil measuring and feeding mechanism, the can bodies are next passed under the fluxing roller 120, 121 and through the can head feed chute B. The means for feeding the heads B comprises preferably two upright standards 34, having ribs 35, and plates 36 attached thereto to form grooves for the can heads. Each of the uprights 34 is also preferably provided with a rearwardly extending portion 341 adapted to guide the can head and can body while the former is being applied to the latter. The can heads feed by gravity and the lowermost one rests upon projections 37, which are so located as to allow the lowermost edge of the lowest can head to engage with the flange of the can body as the latter is passed beneath the head chute. As the can body is advanced by the endless conveyer D, the flange on one end of the can body engages the flange of the can head and pulls the lowermost edge of the can head with it. And in order to prevent the can head from becoming displaced or from dropping out of the lowermost part of the chute, I have arranged spring pressed fingers 38 on each side of the chute, which engage the can heads at a point preferably slightly below the center thereof. As the can head is taken forward, it engages the spring pressed fingers 38 and pushes them out of the way, and the can head then drops down upon the can body and is pressed firmly thereon by means of the pressure shoe 39. In order to prevent the can heads from falling after they are past the spring pressed fingers 38, I provide a spring arm 40, attached to one of the uprights and having a curved lower end 41. By using the head feeding mechanism above described, it will be apparent that the feeding depends entirely upon the presence of the can body, as does the feeding of the oil to the cans.

From the head feeding device, can bodies are next taken to the tucking or folding or crimping mechanism C. This crimping mechanism may be constructed in various ways, but I have shown the same as comprising an upper cam member 42, having depending flange portions 43, provided with recesses or grooves 44 within which are adjustably mounted the cams 45. Each of these cams has therein a diagonally disposed slot 46 and is adjustably mounted in the cam plate 42 by means of the bolts 47 and 48. This cam plate 42 is oscillated by means of an arm 49, attached to the plate, the hub being rigidly attached to the cross piece 51 of the frame of the machine. Formed rigidly and preferably integrally with this hub 50 is a stationary plate 510, having radial slots 52 therein in each of which operates the finger 53 formed integrally with each bending or tucking member 54 which slides in the grooves 55 in the plate 510. Each of these tucking or bending members 54 is preferably cut away at its upper inner corners, as shown at 56, and is retained in place in the grooves 55 by means of triangular plates 57, attached to the stationary plate 510 by means of screws 58. In order to reduce friction, I preferably mount upon the studs or fingers 53 of the bending members, rollers 59 which operate in the slots 46 of the cam member. Rigidly attached to the lower end of the stationary hub 50 is a plate 60 adapted to fit the can head, and I also provide an ejector 61 for ejecting the can from the tucking or crimping head after the bending members 54 are withdrawn. Each of the bending members 54 is provided with a flange engaging portion 62 which coöperates with the plate 60 to bend the flange of the cover beneath the flange of the body portion, as will best be understood from Figs. 12 and 13. In order to regulate the outward throw of the bending members, I provide the triangular plates 57 with stop shoulders 63 which engage corresponding projections 64 on the bending members. I have shown this tucking mechanism as adapted to a rectangular can in which the bending members are arranged to operate diagonally upon the work, but it is apparent that this tucking mechanism may be adapted for other forms of cans, such as circular or oval cans.

The cans are fed from the head feeding chute to a position on top of a plunger 65 which is directly located beneath the tucking mechanism and the conveyer thereupon comes to rest. During this period of rest, the plunger 65 raises the can body and head thereon to the plate 60 of the tucking mechanism and is held in such raised position until the tucking operation is performed.

The endless conveyer G, which is preferably continuously operated, comprises a plurality of die block links 66, having raised portions 67 corresponding to the contour of the can body flange, and which raised portions 67 form a pressure device for the seams while the same are being passed under the pressure roller and the fusing device. The recesses 68 in the links of the chain, which correspond to the shape of the can body being operated upon, preferably have at their inner portion a grid 69 in which is mounted a knockout or ejector 70, which is operated by a stationary cam 71 mounted at the rear end of the machine on a sleeve 72 incasing the shaft 73, which operates the gear wheels 74—74 over which the endless conveyer G, composed of the links 66, passes. The can bodies with the heads thereon and the flanges tucked are first presented by the endless conveyer G to the pressure device E, which preferably consists of a roller 75 mounted in adjustable spring pressed bearings, as shown more clearly in Fig. 17.

From the pressure device the can bodies are next fed or presented to the heating or fusing device F, which preferably consists of a roller 76, heated by means of a gas flame on the interior thereof, the gas being supplied by means of pipes 77 which enter the roller 76 at each end. The fusing or heating roller 76 is also preferably adjustably mounted in spring pressed bearings similar to the pressure roller 75 and likewise acts as a pressure device during the fusing operation. Each of the rollers 75 and 76 is preferably positively driven by means of gears 78 which are driven from a gear 79 on the shaft 73 by means of a chain 80. I have found by experiment that it is preferable to rotate the roller so that the surface speed of the same is slightly different from the speed of travel of the can body, so that a wiping or drawing effect is produced on the seam during the fusing operation, which effect is somewhat analogous to that produced when a soldering iron is drawn or rubbed over a seam.

In operating upon cans of rectangular cross section, it has been found that the best results are obtained by fusing them diagonally, that is, from one corner to the corner diagonally opposite, in order to allow for the escape of gases formed due to the heat from the fusing or sweating roller, and I have therefore shown my endless conveyer G with the recess 68 therein so arranged as to present the can bodies as in the manner described.

In order to transfer the can bodies from the intermittently operating conveyer D to the continuously operating carrier G, and at the same time to change the position of the can body, I provide the mechanism more particularly shown in Figs. 18 and 19. As the can bodies are fed forward along the table 21 by the fingers 22 on the conveyer D, they engage a track 81 which deflects the can from its line of travel to a position so arranged that it will readily drop into the holes or recesses 68 of the endless conveyer. This track 81 preferably has a lip 82 thereon adapted to engage the under side of the seam on the can body. Coöperating with this track 81 is a similar track 83 having a corresponding ledge 84. The can bodies are pushed along these two tracks 81 and 83 until they engage a spring 85 at a time when the chain or endless conveyer D is at rest, and this spring 85 prevents the can from being carried too far forward by its own momentum. The track 81 at this point is provided with an oscillatory arm 86, having a lower lip 87 in alinement with the lip 82 and on which the seam of the can body is adapted to rest. While the can body is at rest, and while one of the links of the endless conveyer G is approaching a position beneath the can body, the can body is dropped or released by means of the arm 86 being swung outwardly by means of a finger 88 rigidly attached thereto, which is operated by a cam 89 on the link engaging the roller 90 on the end of the arm 88, and which arm 88 is immediately returned to position by means of a spring 91 attached thereto at one end, and to a stationary part of the frame at its other end. As the arm 86 is swung or operated outwardly, it will be apparent that the can body drops down into the recess 68 through a hole 92 in the bed 21 and that upon the next movement of the chain or conveyer D, another can will be placed upon the ledge 84 and the lip 87 and the process of feeding or transferring the can bodies from the intermittently operating conveyer to the continuously operating conveyer repeated.

The machine which is arranged in duplicate is operated from the single power shaft 93, which derives its power through the continuously rotating pulley 94 which is keyed thereto and has a clutch face 95 adapted to engage a corresponding clutch face on the gear 96 loosely mounted on the shaft 93. On the opposite end of the shaft 93 is a clutch 97 keyed thereto and slidable thereon and adapted to engage a clutch face formed rigid with a gear 98 loosely mounted on the shaft 93.

It will be obvious that with the mechanism described, the shaft 93 is continuously rotated and that either of the gears 96 or 98 may be thrown into operation, independently of the other, by sliding the pulley with its clutch face or the clutch 97 to engagement with the clutch faces of the gears 96 or 98 as by means of clutch operating levers 196. Each of the endless conveyers G is operated from either the gear 96 or 98 by means of an interposed gear 100, fixed to a shaft 101, and having thereon a sprocket 102 operating the chain 103, which in turn rotates the gear 104 on the shaft 105 upon which are mounted two of the said conveyer gears 74. Each of these shafts 101 and 105 extends to the middle of the machine but they are formed independently of each other, as are all the other cross shafts of the machine, except the power shaft 93. Mounted on the shaft 101 is another gear or sprocket 106 over which passes a sprocket chain 107 for rotating the sprocket 108 on the shaft 109. Upon this shaft 109 is mounted a cam 110 which operates the rod 111, which is preferably made adjustable and which is pivotally attached to the plunger 65, as shown in Fig. 3. Mounted on the outer end of each of the shafts 105 are cams 112 engaging rollers at the lower ends of members 113, pivoted to the frame at 114, the upper ends of which members 113 are pivotally connected, preferably by means of an adjustable link to the arm 49 of the cam 42. Each of the chains or endless conveyers D is operated from a vertical shaft 115 by means of a bevel gear 116 thereon at its lower end which engages a corresponding bevel gear 117 on the cross shaft 118. This cross shaft 118 is given an intermittent rotation from the shaft 109 by means of the well known Geneva construction 119. Located between the oil feeding and measuring device and the head or cover feeding device and above the path of travel of the cans, is a fluxing roller 120, preferably mounted in the base members of the feed chute. This roller is preferably a "composition" roller or one that is more or less flexible and contacts the upper face of the solder coated flange of the body to flux the same with the oil used in packing the fish. This oil is fed to the roller by means of over filled cans that pass through the oiler, the superfluous oil being absorbed by the roller, thereby keeping the same wet. Preferably I employ a second roller 121, located above the fluxing roller, the roller 121 being of steel and knurled, whereby the oil is picked up from the flux roller and spread again, more evenly on the flux roller.

Although I have described my machine as adapted to operate on rectangular can bodies and covers, it is apparent that the same may easily be adapted to operate on cans of other forms. I have also shown the machine as adapted to tuck or clench or fold the flange of the cover around that of the body but changes well within the scope of my invention may be made adapting the same for use with bodies and covers, in which the body flange is wider than that of the cover, and operating to fold the body flange over that of the cover. A great many changes may also be made in the different parts and details of my machine, and more particularly in the specific forms of the tucking mechanism, the location and form of the intermittently operating conveyer, the details of the can body transferring mechanism, the form and type of the seam pressure means and fusing devices and in the form and arrangement of the various driving means for the different parts of the machine, without in any way departing from the spirit of the invention. And all such changes are contemplated as fairly come within the scope of the appended claims.

I do not claim herein the oil feeding mechanism, the same forming a part of my divisional application Serial #91,914, filed April 18, 1916.

I claim:—

1. In a machine of the class described, the combination with a head tucking mechanism which bends the flanges of the can heads underneath the already formed flanges of the can bodies and clamps said parts together with the solder between them, of fusing means for fusing said solder.

2. In a machine of the class described, the combination with a clencher head which secures together the can body and head with unfused solder between them, of a pressure fusing device for fusing the solder so carried between the head and the body flanges, and automatic means for transferring can bodies from said clencher head to said fusing device.

3. The combination with a head feeder, of head tucking mechanism which bends the flanges of the can heads underneath the already formed flanges of the can bodies, and fusing means, substantially as specified.

4. In a machine of the class described, the combination with a can head feeder, of flange tucking mechanism, fusing roller, and means for feeding a can body from the flange tucking mechanism to the fusing roller, substantially as specified.

5. In a machine of the class described, the combination with an automatically operated can head feeder, of head tucking mechanism which bends the flanges of the can heads underneath the already formed flanges of the can bodies, a fusing device and automatic means for transferring can bodies from said feeder to said tucking mechanism, and to said fusing device, substantially as specified.

6. In a machine of the class described, the combination with head tucking mechanism which bends the flanges of the can heads underneath the already formed flanges of the can bodies, a pressure device and fusing means, substantially as specified.

7. In a machine of the class described, the combination with a clencher head which bends the flanges of the can heads underneath the already formed flanges of the can bodies, of a seam pressure device, fusing means, and automatic means for feeding the can bodies from the clencher head to the pressure device and the fusing device, substantially as specified.

8. In a machine of the class described, the combination with an intermittently operating flange tucking mechanism, of a pressure roller, a fusing roller and can body conveying means, substantially as specified.

9. In a machine of the class described, the combination with a head feeder, of flange tucking mechanism, a pressure device and a fusing device, substantially as specified.

10. In a machine of the class described, the combination with a cover feeder, of flange tucking mechanism, a pressure device, fusing means and can body conveying devices, substantially as specified.

11. In a machine of the class described, the combination with a gravity operated head feeding device, of head tucking mechanism which bends the flanges of the can heads underneath the already formed flanges of the can bodies, and a fusing device, substantially as specified.

12. In a machine of the class described, the combination with head feeding means operating to feed the can heads down upon the bodies while the latter are upright, of pressure fusing means acting to fuse solder which is carried between the body and head flanges, substantially as specified.

13. In a machine of the class described, the combination with a can head feeder operating to feed the can heads down upon the bodies while the latter are upright, of head tucking mechanism which bends the flanges of the can heads underneath the already formed flanges of the can bodies, a fusing device and an intermittently operated endless can body conveyer, substantially as specified.

14. In a machine of the class described, the combination with head feeding means, of flange tucking mechanism and a combined pressure and fusing roller, substantially as specified.

15. In a machine of the class described, the combination with means for automatically feeding can heads substantially transversely to the path of the can bodies and means for seating the head within the body, of a head tucking mechanism, a pressure roller, and a fusing device, substantially as specified.

16. In a machine of the class described, the combination with means for automatically feeding can heads, of flange folding mechanism, an intermittently operated endless conveyer and a combined pressure and fusing device, substantially as specified.

17. In a machine of the class described, the combination with means for automatically feeding can heads, of a head tucking mechanism, a pressure device, a fusing device and can body conveying means, substantially as specified.

18. In a machine of the class described, the combination of two parallel sets of mechanisms each comprising an intermittently operating flange tucking mechanism, a fusing device, and means for transferring can bodies from each of the tucking mechanisms to its corresponding fusing device; a power shaft and power operating mechanisms so arranged that either set of said parallel mechanisms may be operated independently of the other from the said power shaft, substantially as specified.

19. In a machine of the class described, the combination of two sets of parallel mechanisms each comprising a head feeding device, a flange tucking mechanism, a fusing device, and means for conveying can bodies from the head feeder and flange tucking mechanism to the fusing device; and driving mechanism so arranged that either set of parallel mechanisms may be operated independently of the other from the same power shaft, substantially as specified.

20. In a machine of the class described, the combination with flange tucking mechanism, of fusing devices, an intermittently operating endless conveyer arranged to convey can bodies to the tucking mechanism, and a continuously operating endless conveyer arranged to convey the said bodies after the tucking operation to the said fusing devices, substantially as specified.

21. In a machine of the class described, the combination with flange tucking mechanism, of a pressure device, fusing means, an intermittently operating endless conveyer arranged to convey can bodies to the tucking mechanism, and a continuously operating endless conveyer, arranged to convey said bodies to the said pressure device and fusing means, substantially as specified.

22. In a machine of the class described, the combination with a can head feeding device, of flange tucking mechanism, fusing devices, an intermittently operating endless conveyer and a continuously operating endless conveyer, substantially as specified.

23. In a machine of the class described, the combination with a can head feeder, of flange tucking mechanism, a pressure device, fusing means, an intermittently operating endless conveyer and a continuously operating endless conveyer, substantially as specified.

24. In a machine of the class described, the combination with flange tucking mechanism, of fusing devices, an intermittently operating endless conveyer, a continuously operating endless conveyer and means for transferring can bodies from the intermittently operating conveyer to the continuously operating conveyer, substantially as specified.

25. In a machine of the class described, the combination with flange tucking mechanism, of a pressure device, fusing means, an intermittently operating endless conveyer, a continuously operating endless conveyer, and means for transferring can bodies from the intermittently operating conveyer to the continuously operating conveyer, substantially as specified.

26. In a machine of the class described, the combination with a can head feeding device, of flange tucking mechanism, fusing devices, an intermittently operating endless conveyer and a continuously operating endless conveyer, and means for transferring can bodies from the intermittently operating conveyer to the continuously operating conveyer, substantially as specified.

27. In a machine of the class described, the combination with a can head feeder, of flange tucking mechanism, a pressure device, fusing means, an intermittently operating endless conveyer, a continuously operating endless conveyer, and means for transferring can bodies from the intermittently operating conveyer to the continuously operating conveyer, substantially as specified.

28. In a machine of the class described, the combination with means for feeding can covers, of fusing devices, an intermittently operating endless conveyer, a continuously operating can body conveyer and means for transferring can bodies from the first named conveyer to the second named conveyer, substantially as specified.

29. In combination, a table, an endless can body conveyer operating thereover, a can head chute disposed at substantially right angles to and above the conveyer, projections at the bottom of said chute adapted to support the lowermost can head edgewise to and above the table with its lowest flange in line with the flanges of the can bodies as they are advanced by the conveyer, and spring pressed pins mounted in the base of said chute, whereby the seating of the head within the body is permitted, substantially as specified.

30. In combination, a table, an endless can body conveyer operating thereover, a can head chute disposed at substantially right angles to and above the conveyer, projections at the bottom of said chute adapted to support the lowermost can head edgewise to and above the table with its lowest flange in line with the flanges of the can bodies as they are advanced by the conveyer, spring pressed pins mounted in the base of said chute, a spring arm mounted in said chute and adapted to retain the lowermost can head within the chute, and a bar disposed parallel to the top of the table, and adapted to firmly press the can heads on the can bodies, whereby the heads are seated within said bodies, substantially as specified.

31. In a can body and cover flange tucking or folding device, the combination of a reciprocating chuck and a stationary member, bending members slidably mounted in said stationary member, pins on said bending members operating in slots in said stationary member, said slots being arranged along the lines of sliding of their several bending members, and an oscillating cam plate mounted on said stationary member and having separate adjustable parts adapted to reciprocate the bending members, substantially as specified.

32. In a can body and cover flange tucking or folding device, the combination of a reciprocating chuck and a stationary member, bending members slidably mounted in said stationary member, pins on said bending members operating in slots in said stationary member, an oscillating cam plate mounted on said stationary member and adapted to reciprocate the bending members, means for varying the amount of reciprocation of the bending members, and an ejector mounted on said stationary member, substantially as specified.

33. In a can body and cover flange tucking or folding device, the combination of a reciprocating chuck and a stationary member, bending members slidably mounted in said stationary member, pins on said bending members operating in slots in said stationary member, an oscillating cam plate mounted on said stationary member and adapted to reciprocate the bending members, means for varying the amount of reciprocation of the bending members, and an ejector mounted on said stationary member, said means comprising adjustable blocks in the cam plate having slots therein in which the pins on the bending members are adapted to slide, substantially as specified.

34. In a machine for applying covers to filled cans containing flux, the combination of means for applying the flux to the flange, said means having contact with the filled cans and acting to remove a part of the flux and thereafter having contact with the flanges of succeeding cans, whereby it is adapted to utilize part of the contents of the filled cans as the flux, head feeding means and fusing means, substantially as specified.

35. In a machine of the class described, the combination of a fluxing roller, head feeding means, and a fusing roller, substantially as specified.

36. In a machine of the class described, the combination of an endless continuously moving can body conveyer and a fusing roller mounted adjacent thereto, said fusing roller being positively rotated so as to have a different surface speed than that of the endless conveyer, whereby a slipping or drawing movement of the fusing roller on the can body seam during the fusing operation is obtained, substantially as specified.

WILLIAM E. TAYLOR.

Witnesses:
WILLIAM J. WILSON,
ETHEL E. FERSON.